United States Patent
Aoyama

(10) Patent No.: US 9,294,633 B2
(45) Date of Patent: Mar. 22, 2016

(54) COMMUNICATION CONTROL APPARATUS AND METHOD FOR CONTROLLING THE SAME

(71) Applicant: CANON KABUSHIKI KAISHA, Tokyo (JP)

(72) Inventor: Satoshi Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/409,579

(22) PCT Filed: Aug. 13, 2013

(86) PCT No.: PCT/JP2013/072040
§ 371 (c)(1),
(2) Date: Dec. 19, 2014

(87) PCT Pub. No.: WO2014/034449
PCT Pub. Date: Mar. 6, 2014

(65) Prior Publication Data
US 2015/0146019 A1 May 28, 2015

(30) Foreign Application Priority Data
Sep. 3, 2012 (JP) .................................. 2012-193570

(51) Int. Cl.
*H04N 5/765* (2006.01)
*H04N 1/00* (2006.01)
(Continued)

(52) U.S. Cl.
CPC ....... *H04N 1/00129* (2013.01); *H04N 1/00347* (2013.01); *H04N 1/00408* (2013.01); *H04N 1/00933* (2013.01); *H04N 1/00965* (2013.01); *H04N 5/23206* (2013.01);
(Continued)

(58) Field of Classification Search
CPC .................................................. H04N 21/4223
USPC ........................................... 348/207.1, 14.01
See application file for complete search history.

(56) References Cited

U.S. PATENT DOCUMENTS

2007/0120955 A1* 5/2007 Shimosato ......... H04N 21/4223
348/14.01
2012/0084771 A1 4/2012 Hashimoto et al. ........... 717/176

FOREIGN PATENT DOCUMENTS

| JP | 11-127282 | 5/1999 |
| JP | 2001-077893 | 3/2001 |
| JP | 2005-086263 | 3/2005 |
| JP | 2005-223710 | 8/2005 |

(Continued)

*Primary Examiner* — Joel Fosselman
(74) *Attorney, Agent, or Firm* — Fitzpatrick, Cella, Harper & Scinto

(57) ABSTRACT

There is provided a communication control apparatus comprising connection means for connecting a storage medium that has a memory function for reading and writing data, and a wireless communication function for communicating with an external apparatus. Control means supplies a clock to the storage medium at a predetermined timing and controls the wireless communication function of the storage medium. Obtaining means obtains, after the storage medium is supplied with the clock by the control means, communication protocol information on a communication protocol with which the wireless communication function is compatible from the storage medium. Display means performs display according to the communication protocol information obtained by the obtaining means. The control means stops supplying the clock to the storage medium after the communication protocol information has been obtained by the obtaining means.

18 Claims, 6 Drawing Sheets

(51) Int. Cl.
*H04N 5/232* (2006.01)
*H04N 101/00* (2006.01)

(52) U.S. Cl.
CPC ..... *H04N 2101/00* (2013.01); *H04N 2201/001* (2013.01); *H04N 2201/0084* (2013.01); *H04N 2201/0086* (2013.01); *H04N 2201/0087* (2013.01)

(56) References Cited

FOREIGN PATENT DOCUMENTS

| | | |
|---|---|---|
| JP | 2007-020042 | 1/2007 |
| JP | 2011-114740 | 6/2011 |
| JP | 2012-079061 | 4/2012 |

* cited by examiner

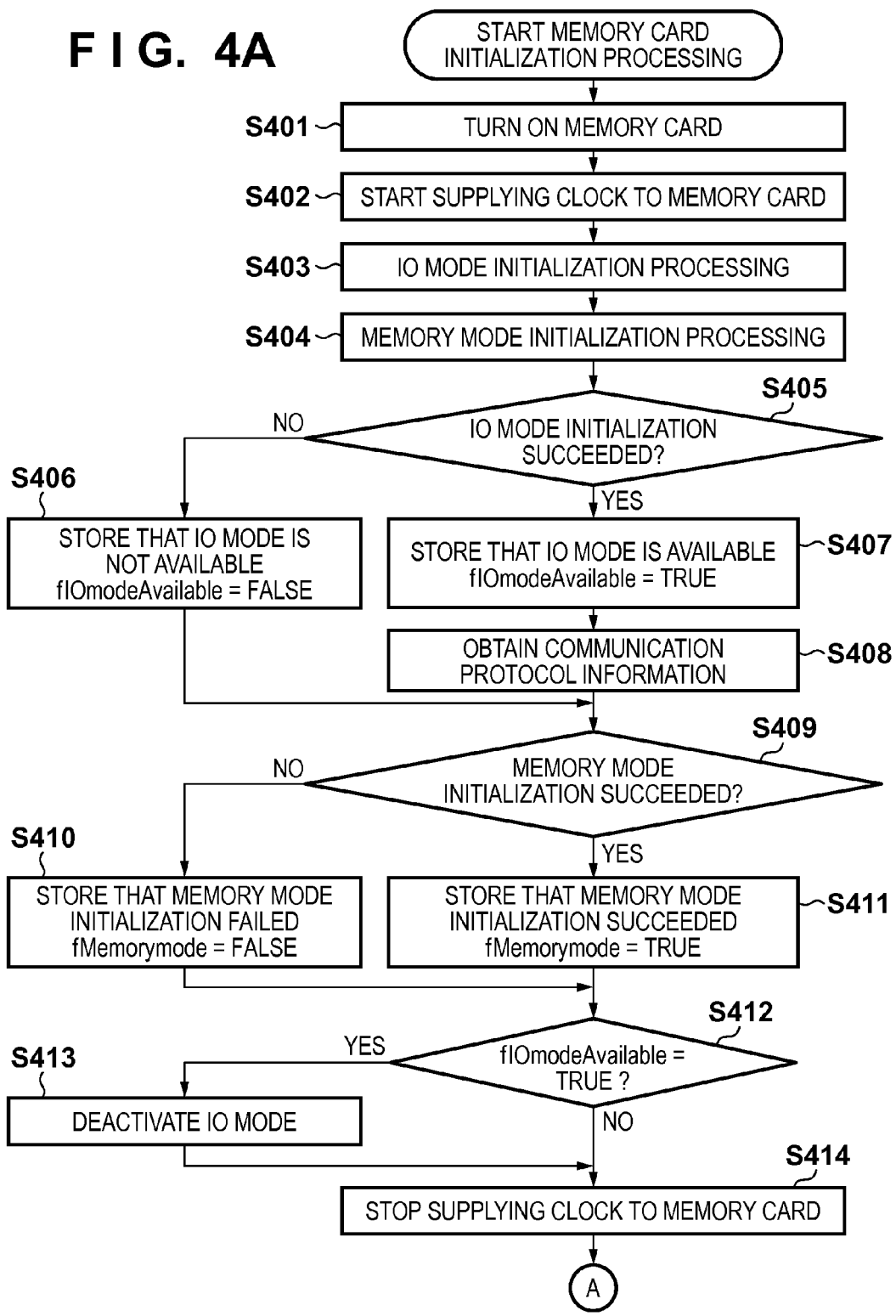

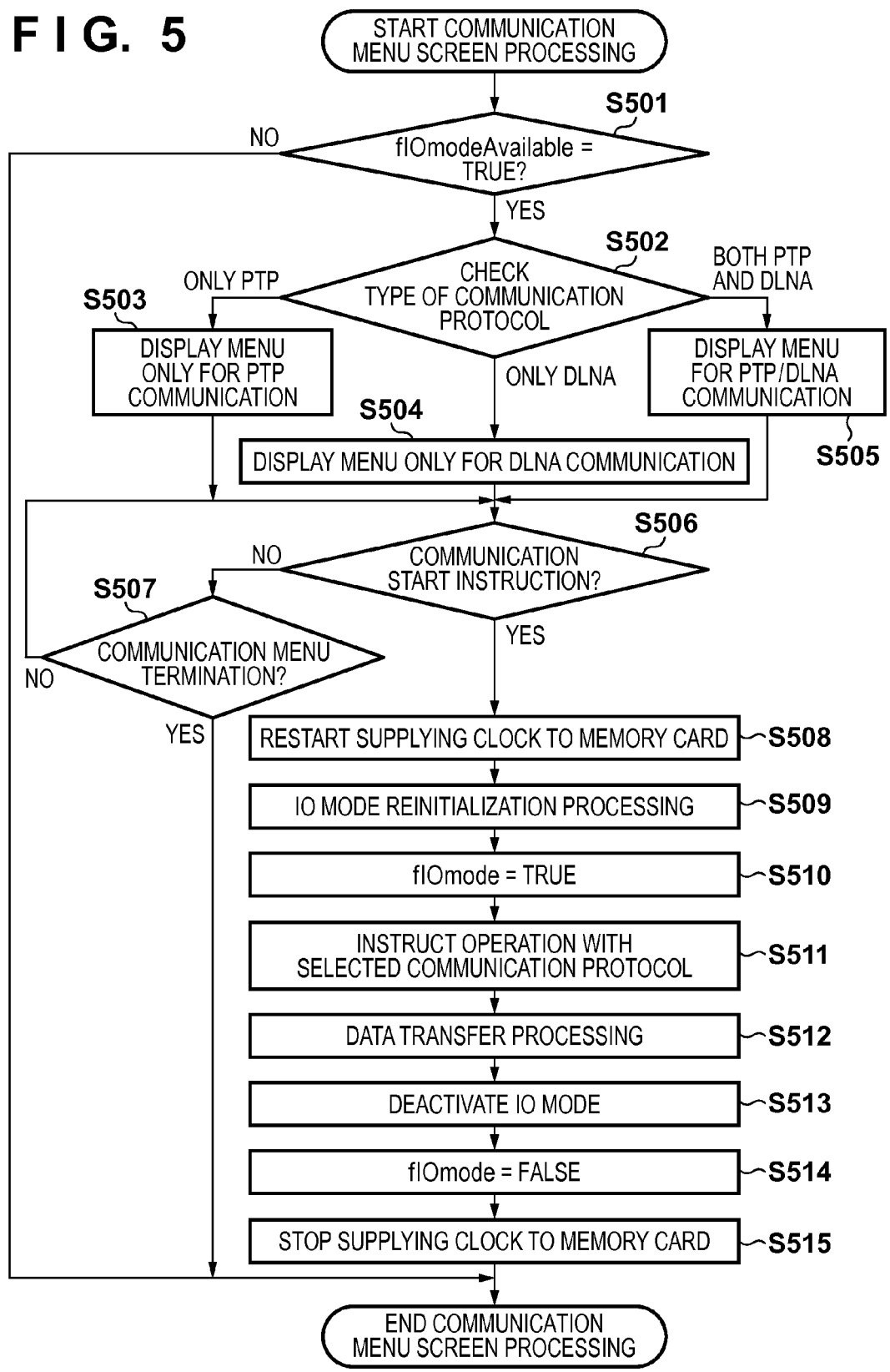

COMMUNICATION CONTROL APPARATUS AND METHOD FOR CONTROLLING THE SAME

CROSS REFERENCE TO RELATED APPLICATION

The present application is a national-stage entry under 35 U.S.C. §371 of International Application No. PCT/JP2013/072040, filed on Aug. 13, 2013, and claims the benefit of foreign priority under 35 U.S.C. §119 of Japanese Application No. 2012-193570 filed on Sep. 3, 2012.

TECHNICAL FIELD

The present invention relates to a communication control apparatus and a method for controlling the same.

BACKGROUND ART

With image capturing apparatuses such as a digital camera, semiconductor memory cards are widely used as storage media for storing captured image data. When transferring the stored image data to an external apparatus such as a personal computer (PC), a printer, or a television receiver (TV), conventionally a digital interface of the digital camera is generally connected to a digital interface of the external apparatus with a cable. See, for example, Japanese Patent Laid-Open No. 2005-223710.

Also, in recent years, a combo card is known that has, in addition to a memory function for storing image data, a wireless communication function. By mounting this combo card for use in a digital camera, it is possible to wirelessly transfer image data from the digital camera to an external apparatus that has a wireless communication function.

The digital camera can switch the memory function and the wireless communication function of the combo card between being activated and deactivated. When the memory function is active, the combo card operates in response to reception of a command from the digital camera. Therefore, the digital camera only needs to supply a clock to the combo card when actually accessing the combo card to read or write image data and the like. On the other hand, when the wireless communication function is active, the combo card first issues an interrupt signal or the like to the digital camera that serves as a host. Accordingly, the digital camera needs to constantly maintain the state in which communication with the combo card is possible so as to be able to receive signals from the combo card any time. Therefore, the digital camera continues to supply the clock as well as supplying power to the combo card even while no communication is actually being performed.

As a communication protocol for use in wireless communication between the digital camera and the external apparatus, for example, Picture Transfer Protocol (PTP), which is defined by the Still Imaging Device Class of the USB standard, is known. Also, the Digital Living Network Alliance (DLNA) is known. The former is often used for wireless communication with, for example, a PC, and the latter is often used for wireless communication with, for example, an AV device such as a TV.

In order to wirelessly communicate with an external apparatus using the wireless communication function of the combo card, the digital camera needs to use a communication protocol with which this external apparatus is compatible. On the other hand, the combo card is not necessarily compatible with all communication protocols, and the compatible communication protocol varies among combo cards.

Accordingly, in order to wirelessly communicate with an external apparatus, the digital camera needs to identify the communication protocol with which the combo card is compatible and to select, as the communication partner, an external apparatus that is compatible with this communication protocol. For example, in the case where the combo card is compatible with PTP but not DLNA, the digital camera can select, as the communication partner, a PC that is compatible with PTP but not a TV that is not compatible with PTP.

In order to identify the communication protocol with which the combo card is compatible, the digital camera needs to activate the wireless communication function of the combo card and then to query the combo card.

However, as described above, once the wireless communication function is activated, clock supply and the like is performed even while no communication is actually being performed, thus resulting in the power of the digital camera being wasted. On the other hand, if the wireless communication function is not activated until the time at which communication is actually performed, the digital camera cannot identify the communication protocol with which the combo card is compatible. As a result, the digital camera cannot appropriately select, as the communication partner, an external apparatus that is compatible with the same communication protocol as that of the combo card.

SUMMARY OF INVENTION

The present invention was made in view of such a situation and provides a technology for suppressing, in a communication control apparatus such as a digital camera that is capable of wirelessly communicating with an external apparatus by using a wireless communication function of a storage medium such as a combo card, power consumption associated with the storage medium.

According to an aspect of the present invention, there is provided a communication control apparatus comprising: connection means for connecting a storage medium that has a memory function for reading and writing data, and a wireless communication function for communicating with an external apparatus; control means for supplying a clock to the storage medium at a predetermined timing and controlling the wireless communication function of the storage medium; obtaining means for obtaining, after the storage medium is supplied with the clock by the control means, communication protocol information on a communication protocol with which the wireless communication function is compatible from the storage medium; and display means for performing display according to the communication protocol information obtained by the obtaining means, wherein the control means stops supplying the clock to the storage medium after the communication protocol information has been obtained by the obtaining means.

According to another aspect of the present invention, there is provided a method for controlling a communication control apparatus including connection means for connecting a storage medium that has a memory function for reading and writing data, and a wireless communication function for communicating with an external apparatus, the method comprising: supplying a clock to the storage medium at a predetermined timing and controlling the wireless communication function of the storage medium; obtaining, after the storage medium is supplied with the clock in the supplying, communication protocol information on a communication protocol with which the wireless communication function is compatible from the storage medium; and performing display according to the communication protocol information obtained in the obtaining, wherein in the supplying, supply of the clock to the storage medium is stopped after the communication protocol information has been obtained in the obtaining.

With the above-described configurations, according to the present invention, it is possible to suppress, in a communication control apparatus such as a digital camera that is capable of wirelessly communicating with an external apparatus with the use of a wireless communication function of a storage medium such as a combo card, power consumption associated with the storage medium.

Further features of the present invention will become apparent from the following description of exemplary embodiments with reference to the attached drawings.

BRIEF DESCRIPTION OF DRAWINGS

FIGS. 4A to 4B are flowcharts illustrating processing for initializing the memory card 200 performed by the digital camera 100.

FIG. 5 is a flowchart illustrating communication menu screen processing performed by the digital camera 100.

DESCRIPTION OF EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

In the following embodiments, a digital camera is described as an example of a communication control apparatus. However, the communication control apparatus is not limited to the digital camera, and may be any apparatus that can wirelessly communicate with an external apparatus with the use of a wireless communication function of a combo card.

First Embodiment

Digital Camera Configuration

Figure 1:
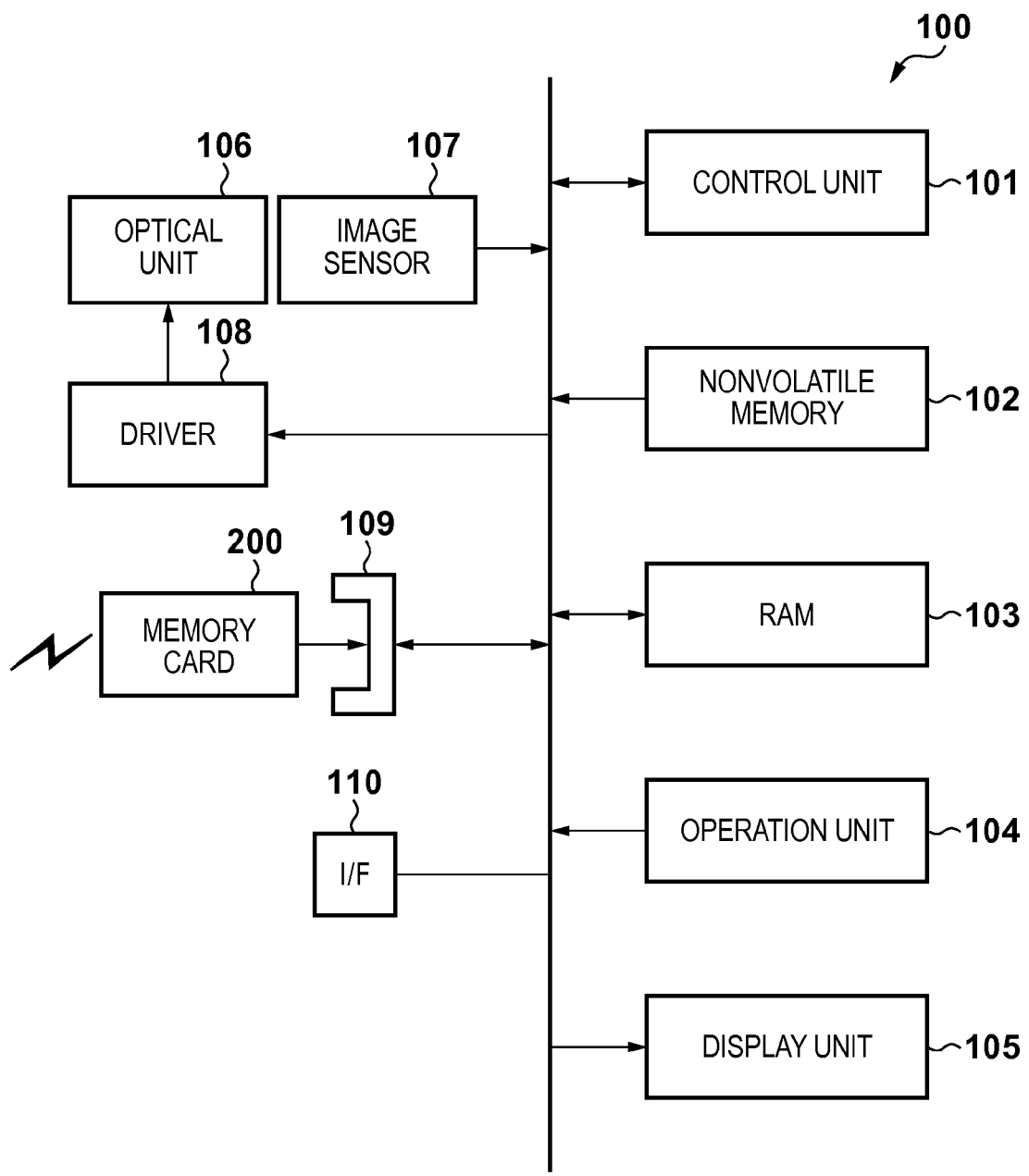
FIG. 1 is a functional block diagram of a digital camera 100.

FIG. 1 is a functional block diagram of a digital camera 100. A control unit 101 is, for example, a programmable processor such as a CPU or an MPU, and controls the entire digital camera 100. A nonvolatile memory 102 stores processing procedures (program) of the control unit 101, various types of settings of the digital camera 100, graphical user interface (GUI) data such as a menu screen, and the like. A RAM 103 is used as a work area of the control unit 101. An operation unit 104 is a group of buttons and switches, and is used for a user to give various types of instructions to the digital camera 100. A display unit 105 is, for example, a liquid crystal display (LCD), and is used for displaying captured images or a menu screen for selecting various types of settings. An optical unit 106 is constituted mainly by a lens (a zoom lens, a focus lens, or the like), an actuator for driving the lens, and the like. An image sensor 107 is a CCD image sensor or a CMOS image sensor. Under the control of the control unit 101, a driver 108 controls the optical unit 106. A connector 109 is a connector for connecting a memory card 200, which is a detachable storage medium. As will be described later, the memory card 200 of the present embodiment is a combo card that has, in addition to a memory function, a wireless communication function. As an example, the memory card 200 is an SD memory card (SD is a registered trademark). An interface (I/F) 110 is a digital interface, such as a USB interface, an IEEE 1394 interface, an HDMI (registered trademark) interface, and is used for connecting an external apparatus by wired connection.

Memory Card Configuration

Figure 2:
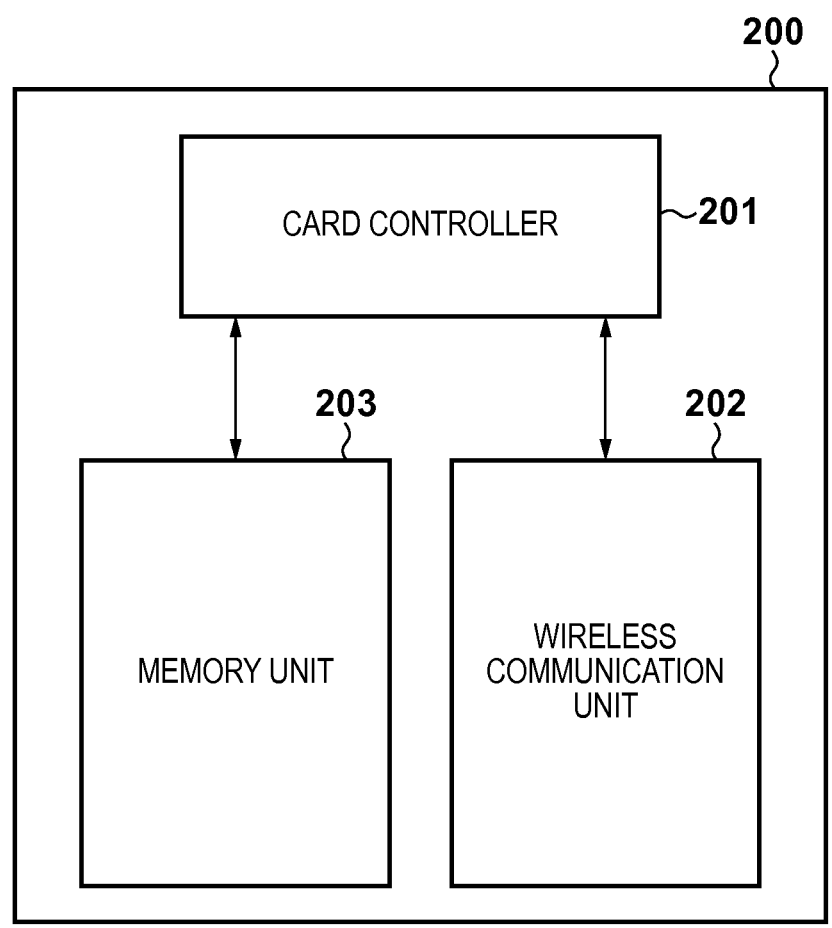
FIG. 2 is a functional block diagram of a memory card 200.

FIG. 2 is a functional block diagram of the memory card 200. The memory card 200 includes a card controller 201, a wireless communication unit 202, and a memory unit 203.

The card controller 201 includes, for example, a CPU, a ROM, a RAM, and the like. Control of the wireless communication unit 202 of the memory card 200, communication of the memory card 200 with an external apparatus on a wireless communication network, and operation of the memory card 200 as a storage medium for the digital camera 100, and the like are realized by the card controller 201 performing control.

The wireless communication unit 202 has the wireless communication function that is compliant with a wireless communication standard such as IEEE 802.11x or Bluetooth (registered trademark), and realizes communication with an external apparatus on the wireless communication network. In the present embodiment, it is assumed that the wireless communication unit 202 has a wireless LAN communication function that is compliant with the IEEE 802.11a/b/g/n standards.

The memory unit 203 includes a nonvolatile memory of, for example, a NAND type, and stores data such as still images, moving images, and sounds that are written via the card controller 201. The memory card 200 is assumed to store files in compliance with a predetermined file system, such as the Design rule for Camera File (DCF) system, for functioning as a storage medium of the digital camera 100.

The memory card 200 has two operation modes. One is a memory mode for storing data in the memory unit 203, and the other one is an input/output (IO) mode for performing communication using the wireless communication unit 202. The card controller 201 performs control such that each of these two modes is activated or inactivated. The digital camera 100 can transmit, to the card controller 201, commands for performing control such that each of the memory mode and the IO mode is activated or deactivated. In response to reception of these commands, the card controller 201 sets the respective modes of the memory card 200 to be activated or deactivated.

Next, a communication function of the memory card 200 when the IO mode is activated will be described. The card controller 201 can cause, by connecting the memory card 200 to a wireless LAN network, the memory card 200 to communicate with an external apparatus on the basis of a plurality of communication protocols.

As a first example, the memory card 200 can use device-to-device communication that is compliant with the Digital Living Network Alliance (DLNA) guideline (hereinafter, referred to as DLNA communication). By using this function, the user, when he or she inserts the memory card 200 into the digital camera 100, can add the digital camera 100 to a DLNA network, enabling the digital camera to wirelessly transmit captured image data to a media player such as a TV, and the media player to playback the captured image data.

As a second example, the memory card 200 can perform device-to-device communication using the Picture Transfer Protocol (PTP). By using this function, the digital camera 100 can wirelessly communicate with another digital camera or a cellular phone that is compatible with PTP, and can transmit and receive captured image data.

The digital camera 100 in the present embodiment has an application that uses the above-described communication function of the memory card 200. Specifically, the digital camera 100 has an application that uses a DLNA communication function of the memory card 200 to connect the digital camera 100 to a TV. Also, the digital camera 100 has an application that uses a PTP communication function of the memory card 200 to connect the digital camera 100 to another digital camera, a portable terminal such as a cellular phone or a so-called tablet device, a PC, a web server, and the like.

On the other hand, the memory card 200 that is connected to the digital camera 100 does not necessarily have both the DLNA communication function and the PTP communication function. The communication protocol with which the memory card 200 is compatible may be, for example, either or both PTP and DLNA.

The digital camera 100 can query as to which communication protocol the memory card 200 is compatible. This query can be made while the IO mode of the memory card 200 is active. By obtaining communication protocol information stored in the ROM of the card controller 201, the digital camera 100 identifies the communication protocol(s) with which the memory card 200 is compatible. If the IO mode is deactivated, the digital camera 100 cannot recognize with which communication protocol the memory card 200 is compatible.

Example of Communication Menu Screen

Figure 3A:
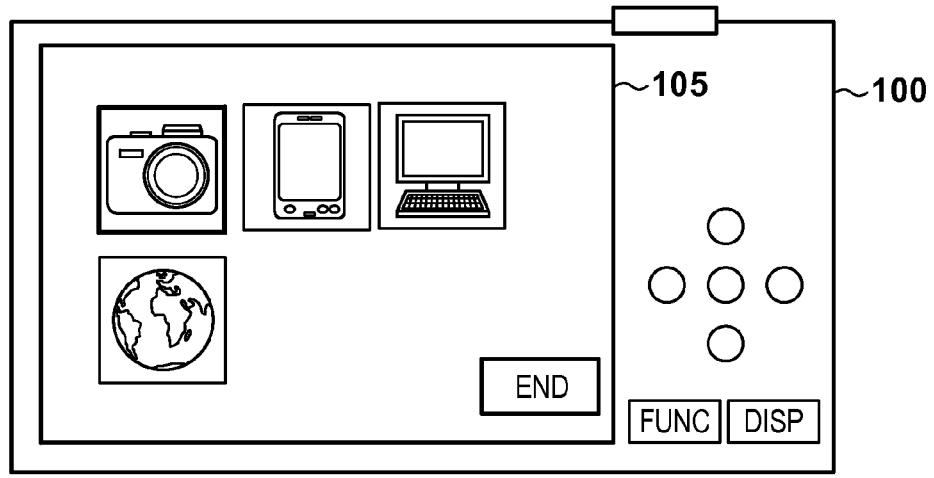
FIGS. 3A to 3C are diagrams each illustrating a display example of a communication menu screen for wireless communication using the memory card 200, the communication menu screen being displayed by the digital camera 100.
Figure 3B:
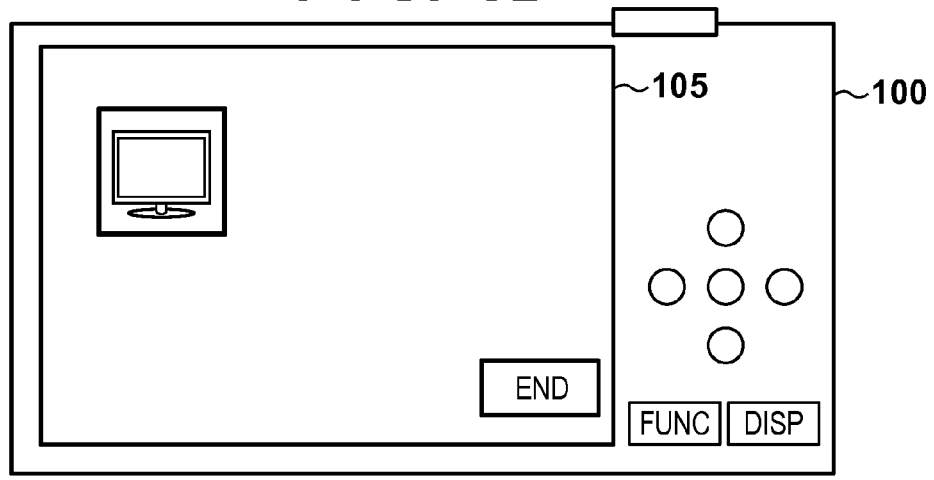
Figure 3C:
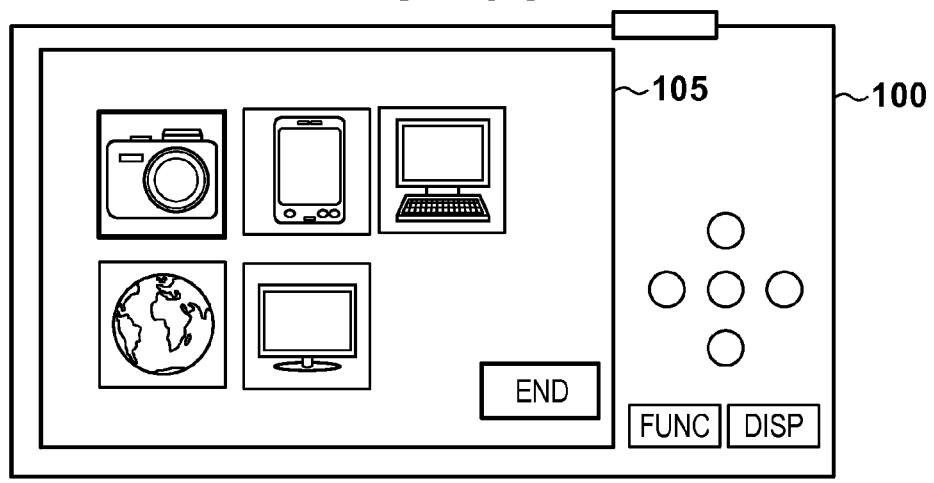

Display examples of the communication menu screen displayed by the digital camera 100 and used for wireless communication using the memory card 200 are described with reference to FIGS. 3A to 3C. The communication menu screens of FIGS. 3A to 3C are each used for a user to select an external apparatus that is the communication partner, and to cause the digital camera 100 to start communicating with the selected external apparatus. If a predetermined user operation is performed on the digital camera 100, the digital camera 100 displays one of the communication menu screens on the display unit 105.

In the present embodiment, as illustrated in FIGS. 3A to 3C, the communication menu screen varies according to the type of communication protocol with which the memory card 200 is compatible. Specifically, the communication menu screen includes, as options of communication partners, at least one icon that indicates an external apparatus that is compatible with the communication protocol with which the memory card 200 is compatible. Accordingly, the digital camera 100 has to identify in advance the communication protocol with which the memory card 200 is compatible in order to display an appropriate communication menu screen. Communication protocol identifying processing will be described in detail later with reference to FIG. 4.

FIG. 3A shows an example of the communication menu screen in the case where a memory card 200 that is compatible only with PTP is inserted into the digital camera 100. The communication menu screen of FIG. 3A displays icons indicating types of devices which can communicate using PTP. Specifically, icons that indicate a digital camera, a portable terminal, a PC, and a web server are displayed. By selecting one of the icons, the user can start processing for communicating with a desired destination.

FIG. 3B shows an example of the communication menu screen in the case where a memory card 200 that is compatible only with DLNA is inserted into the digital camera 100. The communication menu screen of FIG. 3B displays an icon that indicates a TV, which is a device which can communicate using DLNA. By selecting this icon, the user can start processing for communicating with the TV.

FIG. 3C shows an example of the communication menu screen in the case where a memory card 200 that is compatible with both PTP and DLNA is inserted into the digital camera 100. The communication menu screen of FIG. 3C displays the icons indicating types of devices which can communicate using PTP and the icon indicating the device which can communicate using DLNA, together on one screen. Specifically, icons that indicate a digital camera, a portable terminal, a PC, a web server, and a TV are displayed. By selecting one of the icons, the user can start processing for communicating with a desired destination.

Accordingly, by identifying a communication protocol with which the memory card 200 is compatible in advance (before starting actual communication), the digital camera 100 can actively display the communication menu screen that corresponds to the identified communication protocol.

Note that in the case where the memory card 200 is compatible with a plurality of communication protocols, the digital camera 100 may decide an arrangement of the icons according to the order of priority of the communication protocols. In the example of FIG. 3C, PTP has a higher priority than that of DLNA, so the icons corresponding to external apparatuses that are compatible with PTP are displayed first and then the icons corresponding to external apparatuses that are compatible with DLNA are displayed from the upper left toward the lower right.

Also, the digital camera 100 may be configured such that the communication menu screen does not include an icon indicating an external apparatus that is compatible with a communication protocol with which an application of the digital camera 100 is not compatible, among the communication protocols with which the memory card 200 is compatible. For example, in the case where the application of the digital camera 100 is compatible with PTP but not DLNA, the display of the communication menu screen is as illustrated in FIG. 3A even if the memory card 200 is compatible with both PTP and DLNA.

Also, the digital camera 100 is not limited to having the configuration in which one of the communication menu screens of FIGS. 3A to 3C is displayed, and may have any configuration in which the display is performed according to the communication protocol with which the memory card 200 is compatible.

Memory Card Initialization Processing

Figure 4B:
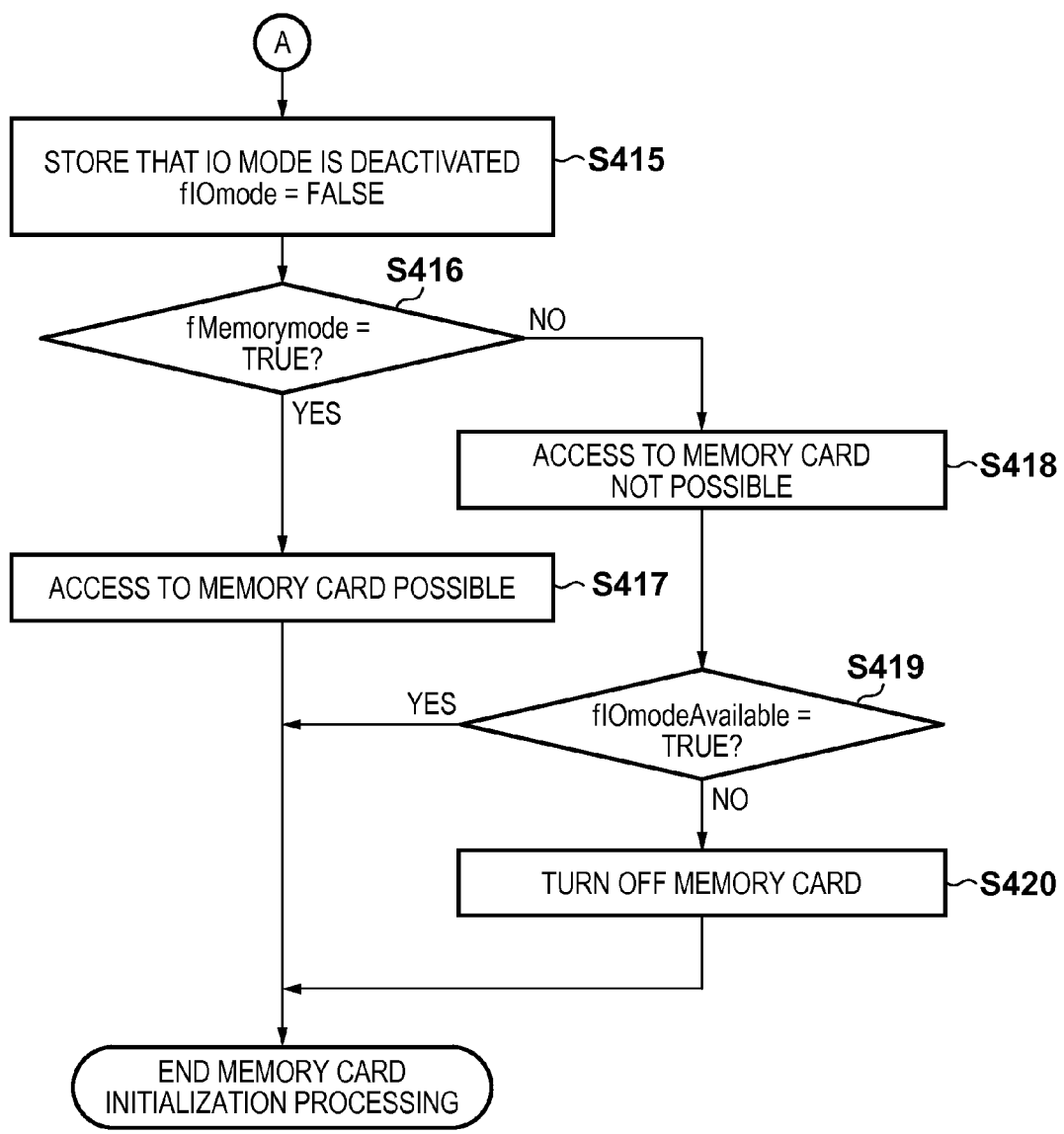

Next, specific operations of the digital camera 100 into which the memory card 200 is inserted will be described with reference to FIGS. 4A and 4B. FIGS. 4A and 4B are flowcharts illustrating processing for initializing the memory card 200 performed by the digital camera 100. The digital camera 100 initializes the memory card 200 at the time of, for example, starting the digital camera 100, in order to store and read image data in and from the memory card 200. The memory card initialization processing of the present embodiment includes communication protocol identifying processing. Processing in steps of the flowchart is realized by the control unit 101 controlling the units of the digital camera 100, unless otherwise noted.

In step S401, the digital camera 100 turns on power supply to the memory card 200. In step S402, the digital camera 100 starts supplying a clock to the memory card 200 in order to issue a command for controlling the memory card 200.

In step S403, the digital camera 100 issues a command for initializing the IO mode and performs IO mode initialization processing, in order to activate the IO mode in which communication using the wireless communication unit 202 of the memory card 200 can be performed.

In step S404, the digital camera 100 issues a command for initializing the memory mode and performs memory mode initialization processing, in order to activate the memory mode in which storage and reading of image data using the memory unit 203 of the memory card 200 can be performed.

In step S405, the digital camera 100 determines whether or not the IO mode has properly been activated by the IO mode initialization processing performed in step S403. If the IO mode has not been activated, the digital camera 100 stores, in step S406, the fact that the IO mode is not available for the currently inserted memory card 200.

Also, if the IO mode has been activated, the digital camera 100 stores, in step S407, the fact that the IO mode is available for the currently inserted memory card 200. Further, in step S408, the digital camera 100 obtains, from the memory card 200, communication protocol information indicating with which communication protocol the memory card 200 is compatible.

In step S409, the digital camera 100 determines whether or not the memory mode has properly been activated by the memory mode initialization processing performed in step S404. If the memory mode has not been activated, the digital camera 100 stores, in step S410, the failure of the memory mode initialization with respect to the currently inserted memory card 200.

Also, if the memory mode has been activated, the digital camera 100 stores, in step S411, the success of the memory mode initialization with respect to the currently inserted memory card 200.

In step S412, the digital camera 100 checks whether or not the IO mode is available for the memory card 200. If the IO mode is available, the digital camera 100 issues, in step S413, a command for deactivating the IO mode and thereby deactivates the IO mode.

In step S414, supplying the clock to the memory card 200 is stopped. In step S415, the digital camera 100 stores the fact that the IO mode has been deactivated.

In step S416, the digital camera 100 determines whether or not the memory mode initialization performed in step S405 was successful. If the memory mode initialization was successful, the digital camera 100 can, in step S417, store and read image data or the like with respect to the memory card 200. On the other hand, if the memory mode initialization failed, the digital camera 100 performs control, in step S418, such that so the digital camera 100 does not store and read image data or the like with respect to the memory card 200.

In step S419, the digital camera 100 determines whether or not the IO mode is available. If the IO mode is available, the memory card initialization processing ends. On the other hand, if the IO mode is not available, this means that neither the IO mode nor the memory mode is available, and thus, in step S420, the digital camera 100 turns off power supply to the memory card 200 and the memory card initialization processing ends.

According to the memory card initialization processing of the present embodiment, since the communication protocol information is obtained in step S408, the digital camera 100 can display the communication menu screen that corresponds to the communication protocol with which the memory card 200 is compatible, as explained with reference to FIGS. 3A to 3C. Also, in step S413, the IO mode is deactivated and in the following step S414, supplying the clock to the memory card is stopped. Therefore, it is possible to suppress occurrence of the situation in which, due to the clock supply, power of the digital camera 100 is wasted despite wireless communication not actually being performed.

Communication Menu Screen Processing

FIG. 5 is a flowchart illustrating communication menu screen processing performed by the digital camera 100. When a predetermined user operation for displaying the communication menu screen is performed on the digital camera 100, the processing of this flowchart starts. The processing of steps of this flowchart is realized by the control unit 101 controlling the components of the digital camera 100, unless otherwise noted.

In step S501, the digital camera 100 determines whether or not the IO mode of the memory card 200 is available. If the IO mode is not available, the communication menu screen is not displayed, and the processing of the present flowchart ends. If the IO mode is available, the processing advances to step S502.

In step S502, the digital camera 100 determines the type of the communication protocol with which the memory card 200 is compatible. If the compatible communication protocol is only PTP, the processing advances to step S503, if the compatible communication protocol is only DLNA, the processing advances to step S504, and if the compatible communication protocol is both PTP and DLNA, the processing advances to step S505.

In step S503, the digital camera 100 displays the communication menu screen for PTP communication as illustrated in FIG. 3A. In step S504, the digital camera 100 displays the communication menu screen for DLNA communication as illustrated in FIG. 3B. In step S505, the digital camera 100 displays the communication menu screen for both PTP communication and DLNA communication as illustrated in FIG. 3C.

In step S506, the digital camera 100 determines whether or not a communication start instruction has been given by the user. For example, if the user has selected a specific icon on the corresponding one of the communication menu screens illustrated in FIGS. 3A to 3C, it is determined that the communication start instruction has been given.

If the communication start instruction has not been given, the digital camera 100 determines, in step S507, whether or not a communication menu termination instruction has been given by the user. If the communication menu termination instruction has been given, the processing of the present flowchart ends. If the communication menu termination instruction has not been given, the processing returns to step S506.

If the communication start instruction has been given in step S506, the processing advances to step S508. In step S508, the digital camera 100 restarts supplying a clock to the memory card 200. In step S509, the digital camera 100 performs processing for reinitializing the IO mode of the memory card 200.

In step S510, the digital camera 100 stores the fact that the IO mode of the memory card 200 is operating (activated). In step S511, the digital camera 100 instructs the memory card 200 to operate with the communication protocol that corresponds to the icon (the communication partner) that is selected on the communication menu screen.

In step S512, the digital camera 100 uses the wireless communication unit 202 of the memory card 200 to perform processing for transferring data to the selected communication party. Upon completion of the data transfer processing, the digital camera 100 performs, in step S513, processing for deactivating the IO mode of the memory card 200. In step S514, the digital camera 100 stores the fact that the IO mode of the memory card 200 is not operating (deactivated). In step S515, the digital camera 100 stops supplying the clock to the memory card 200 and the processing of the present flowchart ends.

As described above, the digital camera 100 supplies a clock to the memory card 200 and activates the IO mode thereof only when actually performing communication. Therefore, it is possible to identify the communication protocol with which the memory card 200 is compatible, and to select the communication partner that is compatible with the identified communication protocol, without consuming excess power.

Modifications

In the above explanation, the communication protocol identifying processing was included in the memory card initialization processing. However, the communication protocol identifying processing may be performed at any timing before the communication menu screen is displayed. For example, the digital camera 100 may perform the communication protocol identifying processing at the time at which the memory card 200 is inserted, at the time of transition into the playback mode, at the time of transition into the communication menu screen, or the like. For example, the case will now be considered in which the communication protocol identifying processing is performed at the time of transition into the communication menu screen. In this case, processing in steps S402, S403, and S405 to S408 in FIGS. 4A and 4B, and processing in steps S412 to S414 are performed at the timing of steps S501 and S502 of FIG. 5.

Also, in the present embodiment, in FIGS. 4A and 4B, the IO mode is deactivated in step S413, and then supplying the clock is stopped in step S414. However, instead of deactivating the IO mode, it is also possible to keep the IO mode constantly activated, and to stop supplying the clock until the communication start instruction is given in step S506 of FIG. 5. In this case, steps S509 to S510 and S513 to S514 of FIG. 5 may be omitted.

Also, in the digital camera 100, transition into the IO mode is not performed, if the user has instructed in advance using the menu or the like a setting in which communication is not performed, such as when a communication function using the memory card 200 has been set to off. In this case, the communication protocol identifying processing is performed, in response to the communication function setting being set to on.

As described above, according to the present embodiment, the digital camera 100 performs processing for identify a communication protocol with which the memory card 200 is compatible prior to the timing at which the communication menu screen is displayed. Then, upon completion of the communication protocol identifying processing, the digital camera 100 deactivates the IO mode of the memory card 200, and stops supplying the clock to the memory card 200.

This makes it possible to suppress power consumption of the digital camera 100 that is associated with the memory card 200.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-193570 filed on Sep. 3, 2012, which is hereby incorporated by reference herein in its entirety.

The invention claimed is:

1. A communication control apparatus comprising:
one or more processors;
a connector configured to connect a storage medium that has a memory function for reading and writing data, and a wireless communication function for communicating with an external apparatus;
a control unit configured to supply a clock to the storage medium at a predetermined timing and control the wireless communication function of the storage medium;
an obtaining unit configured to obtain, after the storage medium is supplied with the clock by the control unit, communication protocol information on a communication protocol with which the wireless communication function is compatible from the storage medium; and
a display unit configured to perform display according to the communication protocol information obtained by the obtaining unit,
wherein the control unit stops supplying the clock to the storage medium after the communication protocol information has been obtained by the obtaining unit,
wherein, when start of communication using the wireless communication function is instructed, the control unit restarts supplying a clock to the storage medium, and activates the wireless communication function if the wireless communication function has been deactivated, and
wherein the control unit, the obtaining unit, and the display unit are implemented using the one or more processors.

2. The communication control apparatus according to claim 1,
wherein the control unit further deactivates the wireless communication function of the storage medium after the communication protocol information has been obtained by the obtaining unit.

3. The communication control apparatus according to claim 1,
wherein the display unit displays a menu screen for selecting an external apparatus that serves as a communication partner, the menu screen including, as an option of a communication partner, an icon that indicates an external apparatus compatible with the communication protocol indicated by the obtained communication protocol information.

4. The communication control apparatus according to claim 3,
wherein the display unit displays the menu screen that does not include an icon that indicates an external apparatus compatible with a communication protocol with which the communication control apparatus is not compatible, among communication protocols indicated by the obtained communication protocol information.

5. The communication control apparatus according to claim 3,
wherein, if the wireless communication function of the storage medium is compatible with a plurality of communication protocols, the display unit decides an arrangement of the icons on the menu screen according to a priority order of the plurality of communication protocols.

6. The communication control apparatus according to claim 1,
wherein the storage medium is an SD memory card and the wireless communication function is a wireless LAN.

7. The communication control apparatus according to claim 1,
wherein the wireless communication function of the storage medium is compatible with at least one of Picture Transfer Protocol (PTP) and Digital Living Network Alliance (DLNA), as the communication protocol.

8. The communication control apparatus according to claim 1,
wherein an operation mode of the storage medium includes a memory mode and an input/output mode, and
the control unit stops supplying the clock by deactivating the input/output mode.

9. The communication control apparatus according to claim 8,
wherein the control unit activates the memory mode and the input/output mode at the predetermined timing.

10. The communication control apparatus according to claim 1,
wherein the predetermined timing is at least one of a timing at which the storage medium is connected to the connector, a timing at which the communication control apparatus transits into a playback mode, or a timing at which the storage medium is initialized.

11. A method for controlling a communication control apparatus including a connector configured to connect a storage medium that has a memory function for reading and writing data, and a wireless communication function for communicating with an external apparatus, the method comprising:
supplying a clock to the storage medium at a predetermined timing and controlling the wireless communication function of the storage medium;
obtaining, after the storage medium is supplied with the clock in the supplying, communication protocol information on a communication protocol with which the wireless communication function is compatible from the storage medium;
performing display according to the communication protocol information obtained in the obtaining;
stopping supply of the clock to the storage medium after the communication protocol information has been obtained in the obtaining; and
when start of communication using the wireless communication function is instructed, restarting supplying a clock to the storage medium, and activating the wireless communication function if the wireless communication function has been deactivated.

12. A non-transitory computer-readable storage medium on which a program is stored, the program causing a computer to execute a method for controlling a communication control apparatus including a connector configured to connect a storage medium that has a memory function for reading and writing data, and a wireless communication function for communicating with an external apparatus, the method comprising:
supplying a clock to the storage medium at a predetermined timing and controlling the wireless communication function of the storage medium;
obtaining, after the storage medium is supplied with the clock in the supplying, communication protocol information on a communication protocol with which the wireless communication function is compatible from the storage medium;
performing display according to the communication protocol information obtained in the obtaining;
stopping supply of the clock to the storage medium after the communication protocol information has been obtained in the obtaining; and
when start of communication using the wireless communication function is instructed, restarting supplying a clock to the storage medium, and activating the wireless communication function if the wireless communication function has been deactivated.

13. A communication control apparatus comprising:
one or more processors;
a connector configured to connect a storage medium that has a memory function for reading and writing data, and a wireless communication function for communicating with an external apparatus;
a control unit configured to supply a clock to the storage medium at a predetermined timing and control the wireless communication function of the storage medium;
an obtaining unit configured to obtain, after the storage medium is supplied with the clock by the control unit, communication protocol information on a communication protocol with which the wireless communication function is compatible from the storage medium; and
a display unit configured to perform display according to the communication protocol information obtained by the obtaining unit,
wherein the display unit displays a menu screen for selecting an external apparatus that serves as a communication partner, the menu screen including, as an option of a communication partner, an icon that indicates an external apparatus compatible with the communication protocol indicated by the obtained communication protocol information,
wherein the control unit stops supplying the clock to the storage medium after the communication protocol information has been obtained by the obtaining unit, and
wherein the control unit, the obtaining unit, and the display unit are implemented using the one or more processors.

14. The communication control apparatus according to claim 13,
wherein the display unit displays the menu screen that does not include an icon that indicates an external apparatus compatible with a communication protocol with which the communication control apparatus is not compatible, among communication protocols indicated by the obtained communication protocol information.

15. The communication control apparatus according to claim 13,
wherein, if the wireless communication function of the storage medium is compatible with a plurality of communication protocols, the display unit decides an arrangement of the icons on the menu screen according to a priority order of the plurality of communication protocols.

16. The communication control apparatus according to claim 13,
wherein the storage medium is an SD memory card and the wireless communication function is a wireless LAN.

17. A method for controlling a communication control apparatus including a connector configured to connect a storage medium that has a memory function for reading and writing data, and a wireless communication function for communicating with an external apparatus, the method comprising:
  supplying a clock to the storage medium at a predetermined timing and controlling the wireless communication function of the storage medium;
  obtaining, after the storage medium is supplied with the clock in the supplying, communication protocol information on a communication protocol with which the wireless communication function is compatible from the storage medium; and
  performing display according to the communication protocol information obtained in the obtaining, wherein the performing includes displaying a menu screen for selecting an external apparatus that serves as a communication partner, the menu screen including, as an option of a communication partner, an icon that indicates an external apparatus compatible with the communication protocol indicated by the obtained communication protocol information; and
  stopping supply of the clock to the storage medium after the communication protocol information has been obtained in the obtaining.

18. A non-transitory computer-readable storage medium on which a program is stored, the program causing a computer to execute a method for controlling a communication control apparatus including a connector configured to connect a storage medium that has a memory function for reading and writing data, and a wireless communication function for communicating with an external apparatus, the method comprising:
  supplying a clock to the storage medium at a predetermined timing and controlling the wireless communication function of the storage medium;
  obtaining, after the storage medium is supplied with the clock in the supplying, communication protocol information on a communication protocol with which the wireless communication function is compatible from the storage medium; and
  performing display according to the communication protocol information obtained in the obtaining, wherein the performing includes displaying a menu screen for selecting an external apparatus that serves as a communication partner, the menu screen including, as an option of a communication partner, an icon that indicates an external apparatus compatible with the communication protocol indicated by the obtained communication protocol information; and
  stopping supply of the clock to the storage medium after the communication protocol information has been obtained in the obtaining.

* * * * *